United States Patent [19]
Csengeri et al.

[11] Patent Number: 6,149,011
[45] Date of Patent: Nov. 21, 2000

[54] MULTI-LEVEL EATING SURFACE APPARATUS AND METHOD

[76] Inventors: Paul James Csengeri, 5624 Calle de Arboles, Torrance, Calif. 90505; A. Winston Marshall, 26340 Monte Vista, Lomita, Calif. 90717

[21] Appl. No.: 09/243,357

[22] Filed: Feb. 1, 1999

[51] Int. Cl.[7] .............................. B65D 5/50; A45C 11/20; A47G 29/00
[52] U.S. Cl. ...................... 206/763; 206/541; 206/765; 211/73; 211/85.4; 229/904; 426/115
[58] Field of Search ...................... 206/541, 542, 206/549, 562, 563, 756, 765, 763; 211/73, 85.4, 72; 229/104, 904; 426/115, 120; D7/549, 552.1, 553.1, 553.3, 552.2, 555

[56] References Cited

U.S. PATENT DOCUMENTS

| | | | |
|---|---|---|---|
| D. 317,102 | 5/1991 | Clark et al. | D7/549 |
| D. 333,237 | 2/1993 | Plaut | D7/553 |
| D. 410,820 | 6/1999 | Lofrano | D7/549 |
| 2,355,206 | 8/1944 | Davidson, Jr. | 229/904 X |
| 2,466,636 | 4/1949 | Bruckner et al. | 229/904 X |
| 2,512,963 | 6/1950 | Peiker | 229/904 X |
| 2,833,458 | 5/1958 | Toensmeier | 229/904 X |
| 2,924,372 | 2/1960 | Kirkeby | 229/904 X |
| 3,434,649 | 3/1969 | Goings | 229/904 X |
| 3,899,119 | 8/1975 | Roccaforte | 206/562 |
| 4,562,926 | 1/1986 | Mode | 206/563 |
| 5,348,218 | 9/1994 | Haire et al. | 229/904 X |
| 5,421,459 | 6/1995 | Mazzotti | 206/549 |
| 5,788,081 | 8/1998 | Bates | 229/904 X |
| 6,012,585 | 1/2000 | Parker | 211/72 |

*Primary Examiner*—Bryon P. Gehman
*Attorney, Agent, or Firm*—Dorothy S. Morse

[57] ABSTRACT

An apparatus with multiple-level eating surfaces, which can be made as separable modular units, molded units having a one-piece construction, and as folded units comprising materials such as paper, plastic, styrofoam. Although it is generally intended for the molded and modular units to be reusable and the folded units to be disposable, the reverse is also contemplated. Modular and molded units typically have a base structure, several pillars of uniform or differing heights, and several elevated eating surfaces supported by least one of the pillars. Alternatively, some folded embodiments have elevated eating surfaces are supported by one or more pillars configured as a rear platform into which several liquid and grease resistant inserts can be secured. Since the present invention provides a dining plate or tray having an enlarged surface area for eating which at the same time maintains a compact footprint, applications may include, but are not limited to, use where table space is limited and does not allow the use of separate salad and dessert plates, use for transporting more food items during each trip to a buffet table without enlarging the size of the base plate people would have to carry, and use in providing a dining plate or tray that maintains separate compartments for foods without undue base plate enlargement; and use as a reward system for children to teach them to eat new foods by offering them a fun way to work their way up to the dessert.

20 Claims, 14 Drawing Sheets

MULTI-LEVEL EATING SURFACE APPARATUS AND METHOD

BACKGROUND

1. Field of the Invention

This invention relates to dining plates and trays, specifically to an apparatus having multiple-level eating surfaces that are intended for use by an individual for the transport and eating of a variety of foods. The various embodiments are configured to retain at least some of the food it supports within separate compartments and provide an advantage over prior art eating devices by creating an enhanced amount of eating surface in combination with a space conserving footprint. Some of the embodiments of the present invention are made from separable modular units, while other embodiments are molded units having a one-piece construction. In addition, other embodiments are configured as a folded unit from materials including but not limited to paper, plastic, and Styrofoam. Although it is generally intended for the modular and molded embodiments to be reusable and the folded embodiments to be disposable, it is also within the scope of the present invention for modular and molded embodiments to be disposable and the folded embodiments to be manufactured so that they can be reused at least one time. The modular and molded embodiments of the present invention have a base structure, several pillars which can optionally differ in height, and several elevated eating surfaces each supported by at least one of the pillars. Alternatively, other embodiments have elevated eating surfaces supported by one or more pillars that can be broadly configured as a rear platform into which one or more separable liquid-resistant or grease-resistant eating surfaces can be secured when needed. It is also contemplated for a beverage or food container, such as a container for french fries, to be positioned against the upper surface of the base plate and extend upwardly through an opening above the base plate in a pillar or rear platform to keep the container upright and securely in place during transport as well as during eating. It is also contemplated for different embodiments of the present invention to comprise a variety of multiple level shapes and surface decorations, that include but are not limited to representations of stadiums, theme parks, race tracks, ski resorts, geographical maps, animals, buildings, cars, trucks, boats, planes, famous landmarks, bridges, musical instruments, planets and other astronomical objects, as well as human beings. Applications may include, but are not limited to, use where table space is limited and does not allow the use of separate salad and dessert plates during a meal, use at buffets for the separation and transport of more food items during each trip to a buffet table without enlarging the size of the base plate people would have to carry, general use in providing a dining plate or tray that maintains separate compartments for foods without having to enlarge the size of the base plate to accomplish such food separation, use as a fun way to present food to children to encourage them to eat new foods as well as to work their way up to a dessert food item instead of eating it first, and further as a learning tool for children when they are taught how to assemble the plate or tray and when numbered eating surfaces are used by the children to earn points.

2. Description of Prior Art

Serving dishes having multiple-levels are known for use in buffets. Multi-tiered structures used for attractively displaying a selection of desserts of hors d'oeuvres have a support system rigidly connecting two or three plates together of similar or upwardly decreasing size in a fixed position one above the other. Family members and guests are able to select food items one at a time from the different levels of such structures for immediate consumption or transfer of the food items onto an individual plate for later consumption. Compartmentalized single-level plates are also known which separate foods so that food flavors do not become mixed and in addition so that the excess liquid from less solid foods does not contact and saturate adjacent dry foods, such as pieces of bread or other baked items, making them less desirable to eat. Plates are also known which have surface indentations of differing depths configured for the placement of a container for a beverage or soup to help maintain the container in an upright position during transport and eating. However, it is not known to have multiple-level eating devices for individual use which are fun to use and have all of the advantages of the different embodiments of the present invention, including secure positioning of a food, such as french fries, or beverage container within the platform with the food or beverage extending upwards through an opening in a platform or pillar, with the food in front of the platform upon the base member being separated from the food in the compartments by the front walls upwardly depending from the platform as well as the downward, diagonally extending front surface of the platform.

SUMMARY OF THE INVENTION

Objects and Advantages

It is the primary object of this invention to provide multiple-level dining plates and trays for individual food transport and eating. It is a further object of this invention to provide multiple-level dining plates and trays for individual food transport and eating use that combine additional food placement surfaces with a compact footprint. It is also an object of this invention to provide multiple-level individual dining plates and trays which are configured for disposal or can be easily cleaned for reuse. A further object of this invention is to provide multiple-level individual dining plates and trays which are configured for compact storage prior to use and between uses. It is also an object of this invention to provide multiple-level individual dining plates and trays which are fun to use by both adults and children and can be used to teach children to eat new foods by having them earn a dessert by earning points or otherwise working their way up to it. A further object of this invention is to provide multiple-level individual dining plates and trays which are compartmentalized to prevent the mixing of foods in such instances where mixing would be undesirable to include any combination of compartmentalized base plates, compartmentalized pillars, compartmentalized rear platforms, and compartmentalized upper eating surfaces. It is also an object of this invention to provide multiple-level individual dining plates and trays which have at least one secret compartment and may also have quick release means to attach utensils or similarly sized toys or objects to its upper surface for safekeeping during transport. A further object of this invention is to provide multiple-level individual dining plates and trays which are designed with surfaces areas suitable for the attachment of decorative and advertisement indicia. It is also an object of this invention to provide multiple-level individual dining plates and trays which are designed for easy construction and cost-effective use.

As described herein, properly manufactured, assembled and used, the present invention would provide a fun-to-use, versatile eating surface that would offer different levels upon which food could be served to an individual. Upper food surfaces attached to and positioned above the essentially planar surface of a base plate or tray would increase the space available for food placement without at the same time increasing the amount of table surface area required by the individual to support the food until it is consumed. Also, upper food surfaces could be used to separate foods from one another when doing so would improve its presentation, as well as enjoyment by the individual. The base plate of the present invention could be equally configured as a plate or a tray. The present invention could also be made as an easily reusable modular device with separable components for easy cleaning and storage; a reusable molded device made as a one-piece unit; or a disposable unit folded from paper, plastic, or Styrofoam which can be stored flat and assembled prior to use, although it is within contemplation for molded and modular embodiments to manufactured so that they can be disposable and for some paper, plastic, or styrofoam embodiments to be reusable at least once.

The reusable modular and molded embodiments could be made from materials such as but not limited to plastic, glass, ceramics, metal, and wood, while it is contemplated that disposable foldable embodiments could be made from materials which include paper, plastic, and Styrofoam. All embodiments can be made to have a variety of sizes, colors, and shapes. For ease of assembly, foldable embodiments can have seam lines which are secured together by adhesives or glue. All embodiments can have the upper eating surfaces at a uniform height or at different heights. When upper eating surfaces at different heights are used, the present invention can be used to teach children to eat new foods by making them work their way up to a dessert located on the eating surface having the highest position. The multiple levels also make the present invention toy-like and therefore useful as a learning tool that captures the interest of children particularly when the surface decoration would include the face of a character familiar to the child. Batteries could be placed within one of the pillars to further enhance the teaching value of the present invention by turning it into a talking character that presented safety related or other important messages to children. Surface areas of all the embodiments can be decorated with markings relating to many diverse topics, such as but not limited to a movie promotion, business logo, advertising campaign, or holiday theme. Such decoration could be contoured to provide 3-D relief. Also, it is contemplated for at least some of the modular and molded embodiments to have designated areas with quick-release fasteners configured for the attachment of utensils or a similarly sized toy or object. Further, embodiments of the present invention could comprise one or more liquid-resistant or grease-resistant compartments for a beverage container or french fries, as well as a hidden compartment for retention of a condiment, prize, or other surprise.

The description herein provides preferred embodiments of the present invention but should not be construed as limiting the scope of the multiple-level eating surface invention. For example, variations in the number of pillars and upper plates used, the number of hidden compartments, the height of the pillars, the angle at which the pillars are positioned relative to the base plate, the perimeter configuration of the base plate, the number of separable food storage areas designated on the base plate, the number of quick-release fasteners used to attach utensils and toy-like objects to the base plate, the use of adhesives or glue to secure seam lines in folded embodiments, the presence of a compartment for a beverage or soup container, and the configuration of the interlocking connection between the pillars and the base plate, other than those shown and described herein, may be incorporated into the present invention. Thus the scope of the present invention should be determined by the appended claims and their legal equivalents, rather than the examples given.

BRIEF DESCRIPTION OF THE DRAWINGS

FIG. 15 is a top view of a first preferred embodiment of an unfolded food-covering sleeve for use with folded embodiments of the present invention, such as the fifth embodiment shown in FIG. 6.

FIG. 16 is a perspective view of the first preferred sleeve embodiment folded and partially covering the food holding surfaces of the fifth embodiment of the present invention.

FIG. 17 is a perspective view of the first preferred sleeve embodiment in its usable position and completely covering the food holding surfaces of the fifth embodiment of the present invention.

DETAILED DESCRIPTION OF PREFERRED EMBODIMENTS

Figure 1:
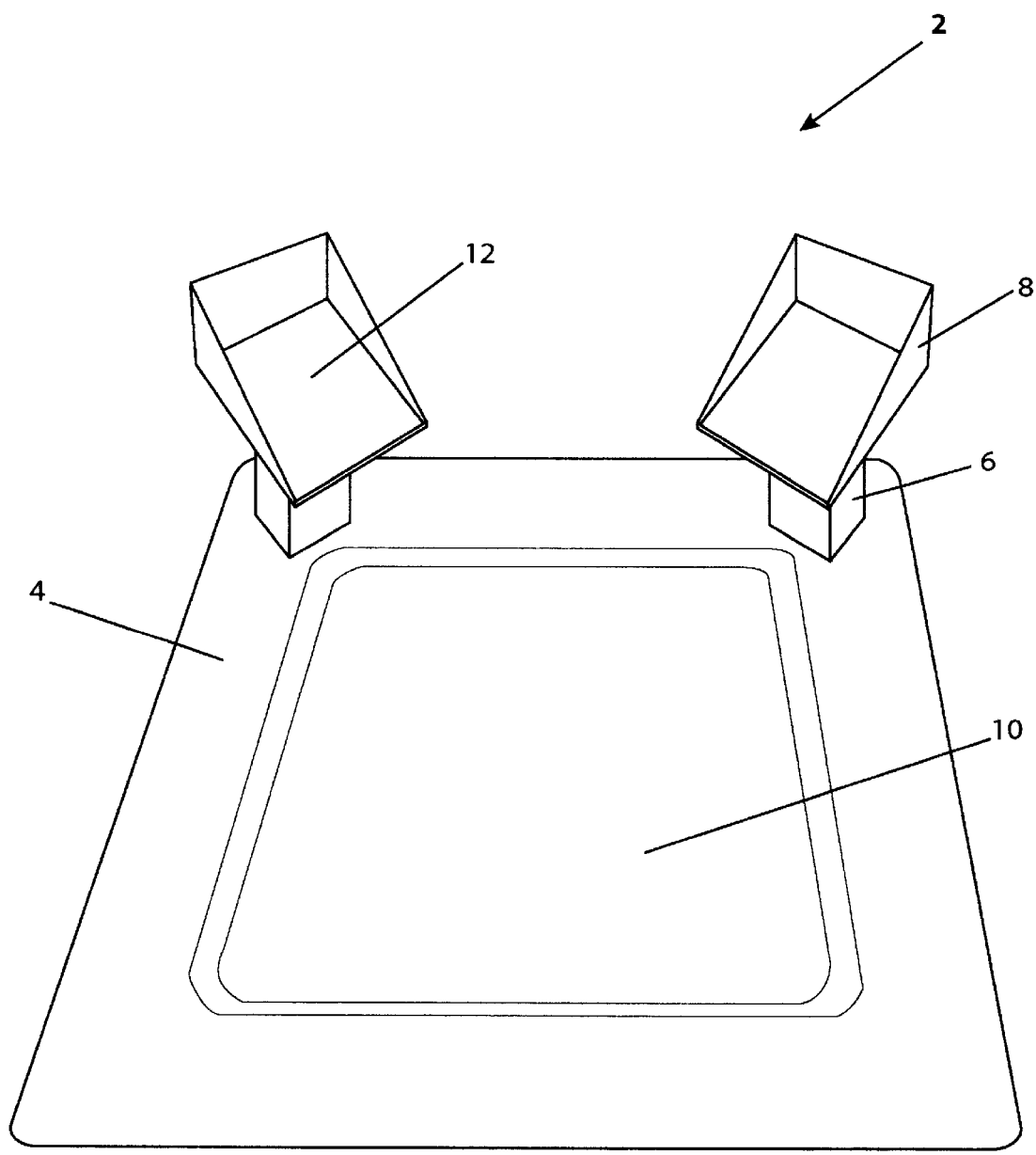
FIG. 1 is a front perspective view of a first embodiment of the present invention having modular components or a one-piece molded construction, with two upper plates each attached to the top surface of a base plate by a pillar in a corner of the base plate remote from a user.

FIG. 1 shows a first embodiment 2 of the present invention as a multiple-level eating apparatus for individuals which has either modular components or a one-piece molded construction, with two upper plates 8 each attached to the top surface of a base plate 4 by a pillar 6. Each upper plate 8 is positioned in a corner of base plate 4 remote from a user (not shown). Although FIG. 1 shows two upper plates 8 and two pillars 6, it is within the scope of the present invention to have more than two upper plates 8 and more than two pillars 6. FIG. 1 further shows base plate 4 having a centrally positioned food-retaining indentation 10. Although FIG. 1 shows base plate 4 having a square perimeter, the perimeter configuration of base plate 4 is not critical and it is equally contemplated for base plate 4 to have an oval perimeter, or one with a hexagonal, triangular, octagonal, or irregularly shaped configuration. Also, although FIG. 1 shows pillars 6 with a rectangular cross-sectional configuration and upper plates 8 each also having a rectangular configuration, it is within the scope of the present invention to have pillars 6 and upper plates 8 with other configurations. FIG. 1 shows pillars 6 approximately perpendicular to base plate 4. However, although not shown, it is also contemplated for pillars 6 to be positioned in a variety of non-perpendicular orientations relative to base plate 4.

FIG. 1 also shows each upper plate 8 having an eating surface 12, with upwardly depending edges which help to resist movement of food (not shown) from off of eating surface 12 during food retrieval and consumption. Reusable embodiments of first embodiment 2, as shown in FIG. 1 could be made from plastics, glass, ceramics, wood, and metal, but are not limited to such materials. When made from separable modular parts, each could have a different color and be either transparent, translucent, or opaque. Also, although not shown, every exposed surface of first embodiment 2 could also be a canvas for decorative markings, or other surface decoration to include but not be limited to 3-D relief, printing, decals, or any combination thereof. Further, first embodiment 2 made as a single-piece unit from molded construction could be formed into many decorative shapes, such as that of a medieval castle, spaceship, or soccer stadium.

In addition, although both pillars 6 in FIG. 1 have a similar height dimension, it is also contemplated for pillars 6 of first embodiment 2 to also have differing height dimensions so that a child (not shown) could be taught to eat new foods by requiring them to eat new foods placed at lower levels and having them work their way up to the reward of a dessert placed at the highest level. The multiple levels also make the present invention toy-like and therefore useful as a learning tool that captures the interest of children particularly when surface decoration would include the face of a character familiar to the child. Batteries (not shown) could be placed within one of the pillars 6 to further enhance the teaching value of the present invention by turning it into a talking character that presented safety related or other important messages to children. Modular construction of first embodiment 2 and the separability of upper plates 8, pillars 6, and base plates 4 would allow for ease in washing and storage of first embodiment 2. The interchangeable nature of upper plates 8, pillars 6, and base plates 4 would also allow first embodiment 2 to be used as a toy by children as long as it did not have any sharp edges, and for each assembled first embodiment 2 to be custom color coordinated for parties to complement or enhance decor.

Figure 2:
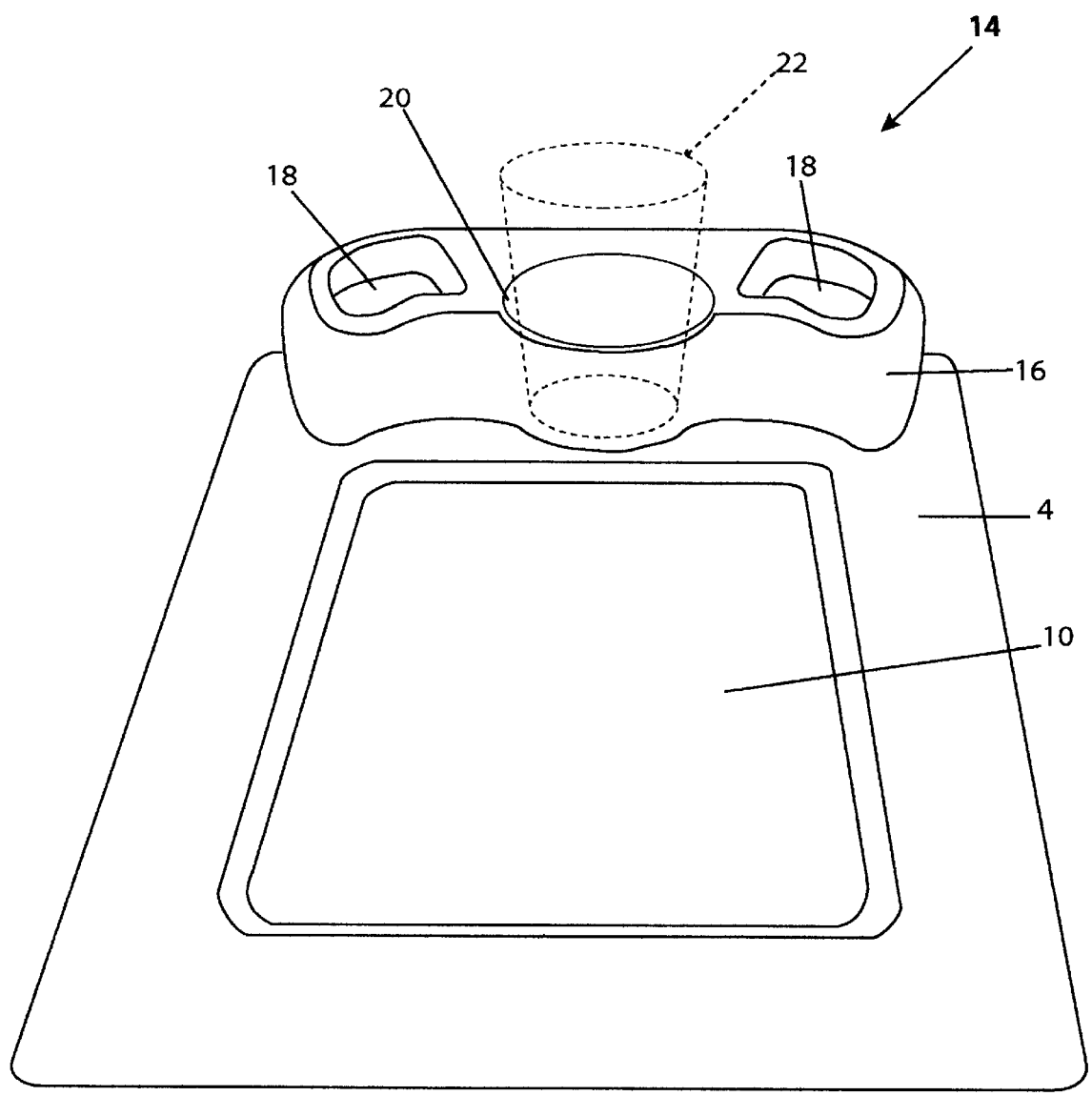
FIG. 2 is a front perspective view of a second embodiment of the present invention having modular components or a one-piece molded construction, with one platform having rounded edges and being attached to the top surface of a base plate in a position remote from a user, the platform having three compartments extending downwardly through its upper surface which are dimensioned for holding a beverage, food, or a small toy.

FIG. 2 shows a second embodiment 14 of the present invention having modular components or a one-piece molded construction, with one platform 16 having rounded edges and being attached to the top surface of base plate 4 in a position remote from a user (not shown). FIG. 2 also shows base plate 4 with a rectangular configuration and a centrally located rectangular indentation 10. The rectangular configuration of neither base plate 4 or indentation 10 is critical. FIG. 2 also shows platform 16 having two small capacity compartments 18 dimensioned for holding either food or a small toy. Small capacity compartments 18 are laterally positioned downwardly through the upper surface of platform 16 with a larger capacity compartment 20 extending downwardly through the upper surface of platform 16 between small capacity compartments 18. FIG. 2 also shows a representation of how a beverage container 22 would be positioned within larger capacity compartment 20.

Figure 3:
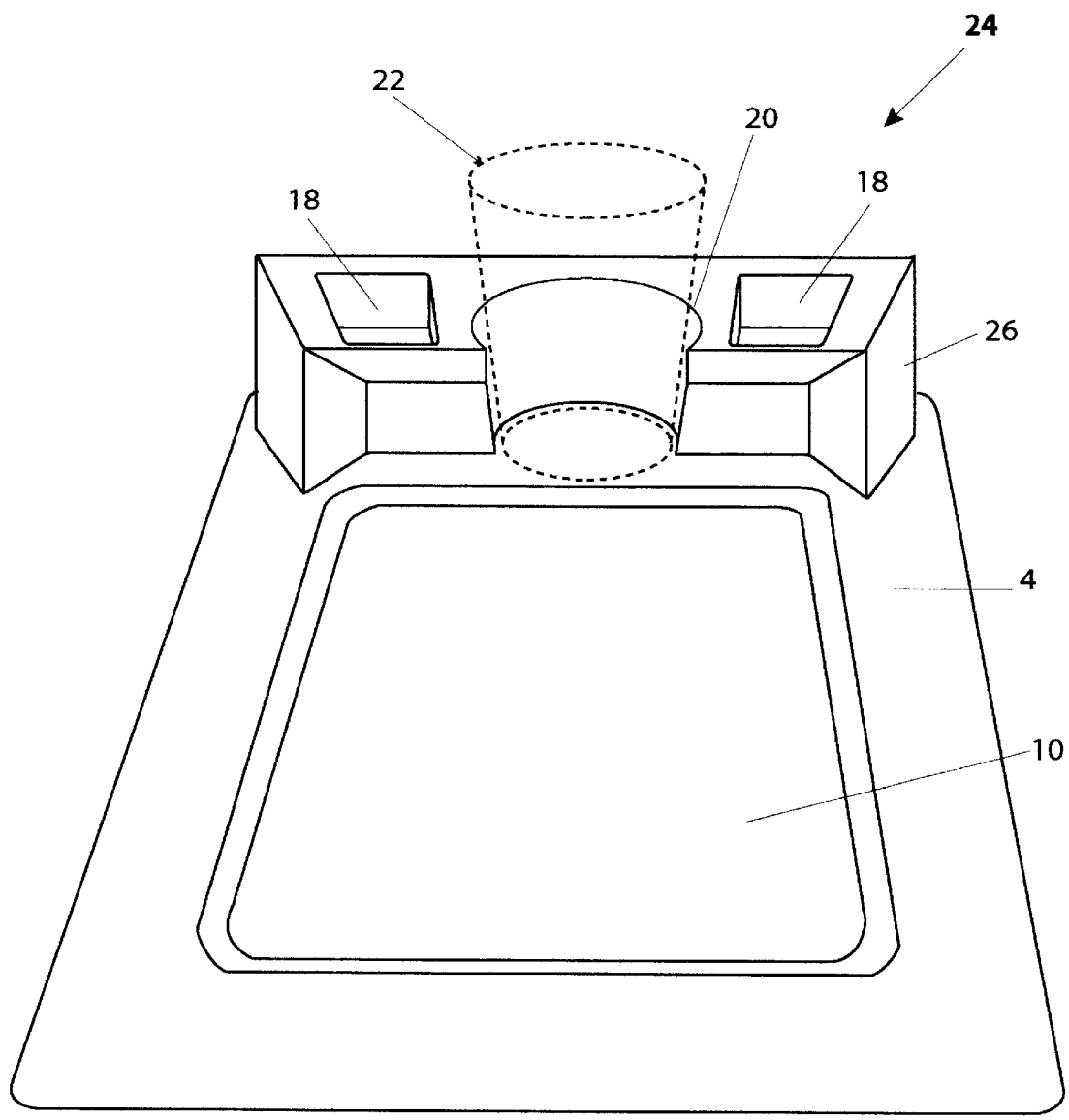
FIG. 3 is a front perspective view of a third embodiment of the present invention having modular components or a one-piece molded construction, with one platform having angular edges and being attached to the top surface of a base plate in a position remote from a user, the platform having three compartments extending downwardly through its upper surface which are dimensioned for holding a beverage, food, or a small toy.

FIG. 3 shows a third embodiment 24 of the present invention having modular components or a one-piece molded construction, with one substantially rectangular platform 26 having angular edges and being attached to the top surface of base plate 4 in a position remote from a user (not shown). FIG. 3 also shows base plate 4 with a rectangular configuration and a centrally located rectangular indentation 10. The rectangular configuration of neither base plate 4 or indentation 10 is critical. FIG. 3 also shows rectangular platform 26 having two small capacity compartments 18 dimensioned for holding either food or a small toy. Small capacity compartments 18 are laterally positioned downwardly through the upper surface of rectangular platform 26 with a larger capacity compartment 20 extending downwardly through the upper surface of rectangular platform 26 between small capacity compartments 18. In FIG. 3, larger capacity compartment 20 also opens through the front side rectangular platform 26 so that a portion of beverage container 22 would extend through the front surface of rectangular platform 26. In contrast, in FIG. 2 larger capacity compartment 20 was configured that beverage container 22 when inserted into larger capacity compartment 20 would be totally positioned within platform 16. Although not shown, many other variations of the modular and molded embodiments of the present invention are possible, such as round or oval base plates 4, a platform 16 or rectangular platform 26 with one small capacity compartment 18 and two larger compartments 20, a platform 16 or rectangular platform 26 with three small capacity compartments 18 and no larger compartments 20, and a platform 16 or rectangular platform 26 with no small capacity compartments 18 and two larger compartments 20.

Figure 4:
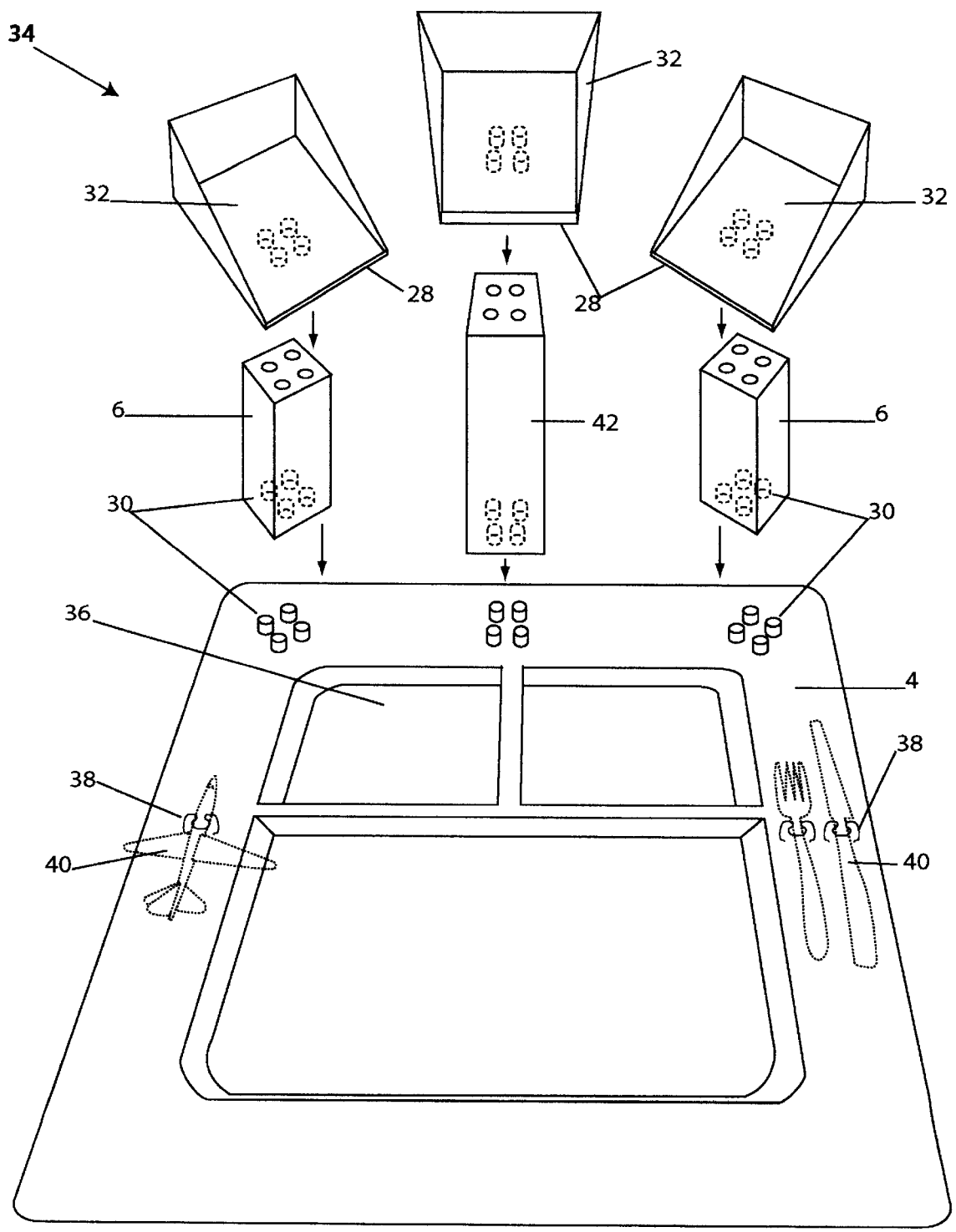
FIG. 4 is a front perspective view of a fourth embodiment of the present invention having modular components including three upper plates each attached to the top surface of a base plate by a pillar in aligned positions remote from a user, the upper plates being dimensioned for holding a beverage, food, or a small toy, the base plate compartmentalized, and with fastening means for utensils and toy-sized objects laterally positioned on the base plate.

FIG. 4 shows a fourth embodiment 34 of the present invention having modular components including three modular upper plates 32 with protrusions attached to its lower surface as part of a quick-releasing snap-together connection 30 and a slightly raised front edge 28 which allows food (not shown) to remain within modular upper plates 32 when a utensil is inserted into the food and moves it around in order to secure a quantity of the food for consumption. Although not shown, other embodiments could have modular upper plates 32 with an upwardly curved front edge 28. FIG. 4 also shows two pillars 6 each having several upper indentations and lower protrusions as part of a quick-releasing snap-together connection 30, with one pillar 6 positioned for attachment to the lower surface of each laterally positioned modular upper plate 32. In addition, FIG. 4 shows one tall pillar 42 having several upper indentations and lower protrusions as part of a quick-releasing snap-together connection 30 positioned for attachment to the lower surface of the centrally located modular upper plate 32. FIG. 4 further shows base plate 4 having a centrally located compartmentalized indentation 36 with several snap-on connectors 38 which allow connection of small objects such as utensils or an elongated toy to be laterally connected base plate 4. FIG. 4 also shows the rear portion of base plate 4 having protrusions as past of a quick-releasing snap-together connection 30 for use in connecting pillars 6 and tall pillar 42 to base plate 4. Although FIG. 4 shows quick-releasing snap-together connection 30 having four centrally located protrusions and four aligned indentations, the configuration of connection 30 is not critical and it is within the scope of the present invention for connection to have any configuration that securely locks modular components such as pillar 6 and modular upper plates 32 in place during use yet is easy to release upon demand. It is contemplated for modular upper plates 32 to each be dimensioned for holding a beverage, food, or a small toy (not shown).

Figure 5:
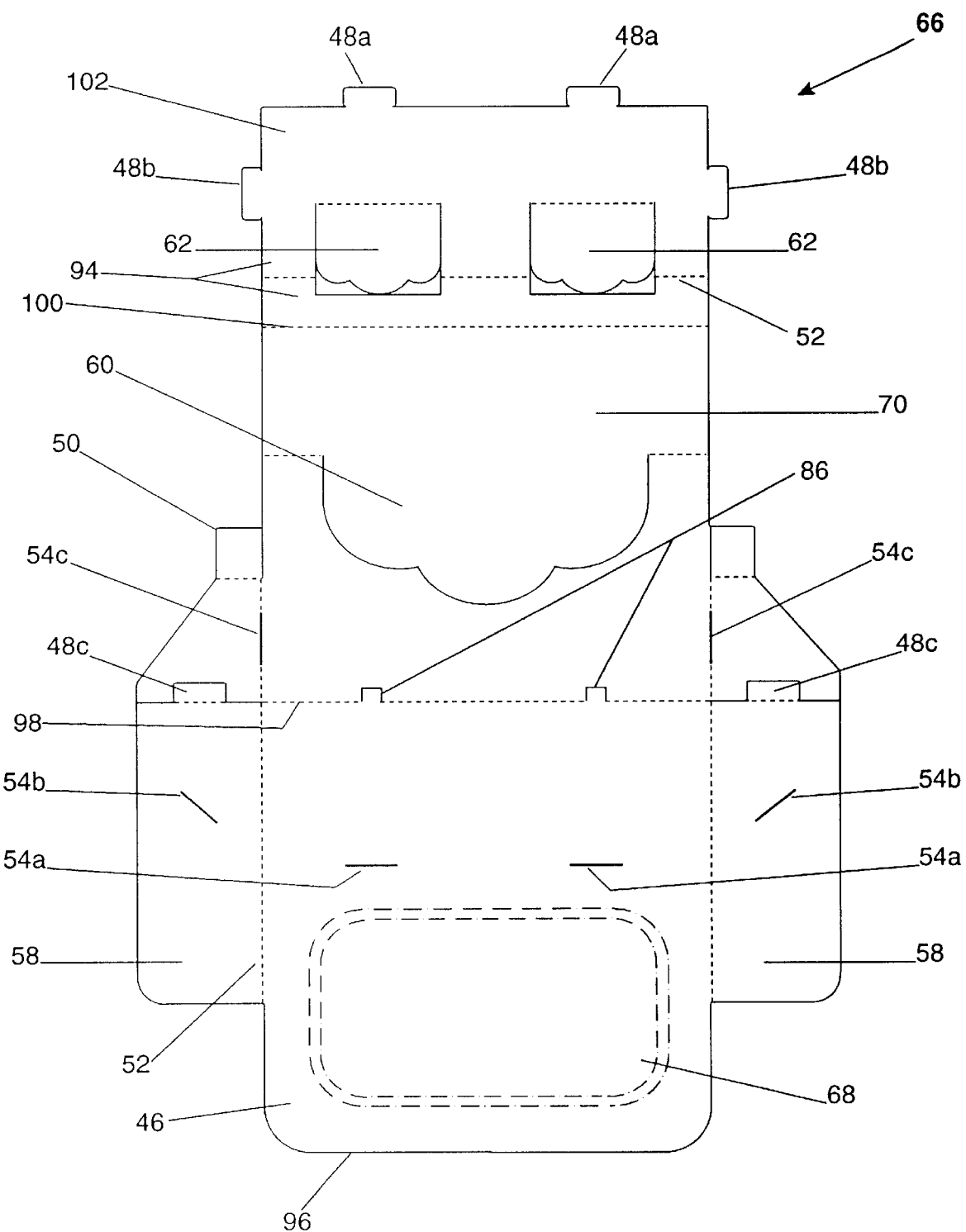
FIG. 5 is a top view of a fifth embodiment of the present invention in a flat unassembled form and having a variety of die cut lines, fold lines, slots, and locking tabs for use in forming an assembled device which would have a base plate and a platform with two compartments extending downwardly through its upper surface which are dimensioned for holding a beverage, food, or a small toy.
Figure 6:
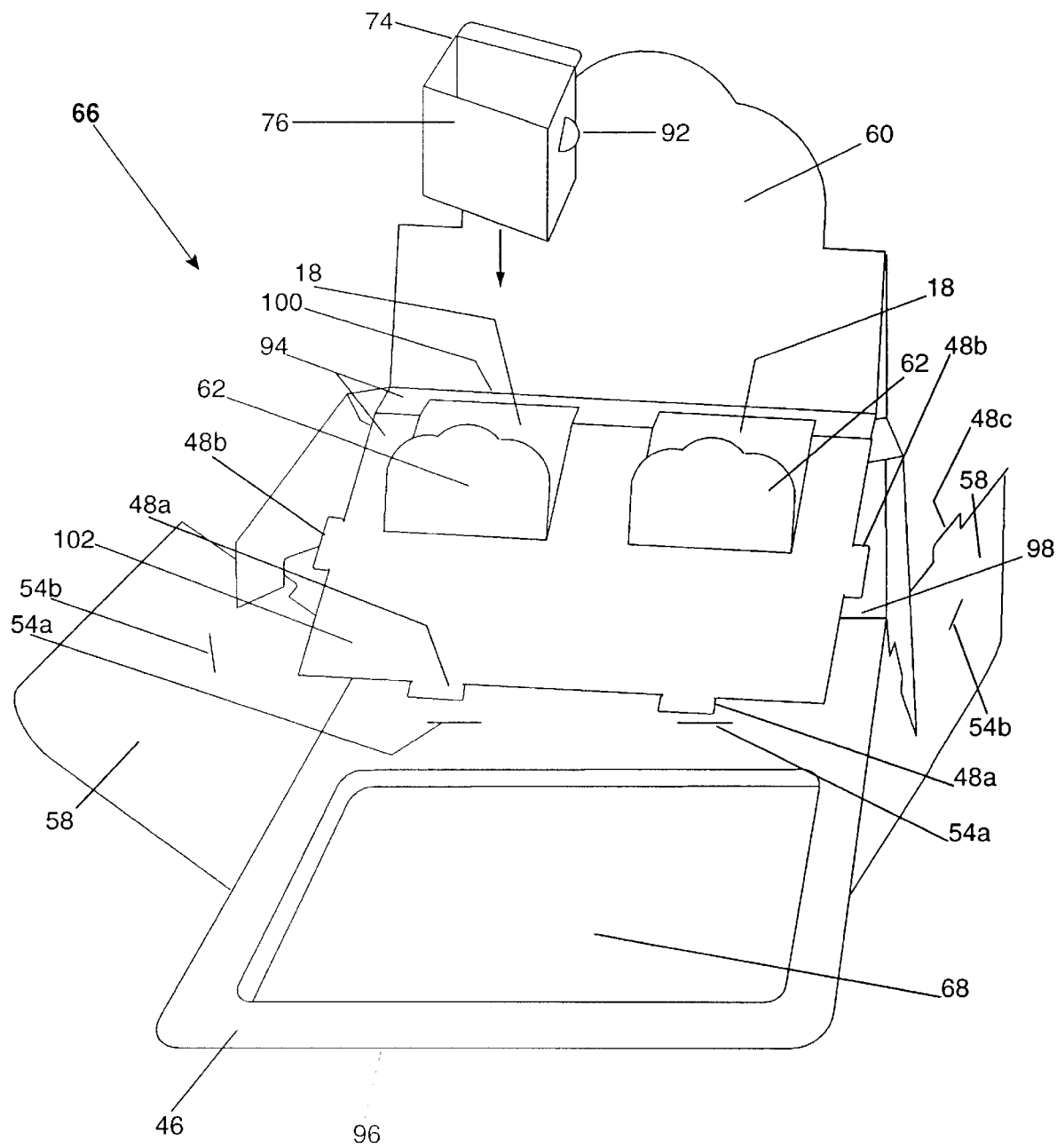
FIG. 6 is a front perspective view of the fifth embodiment of the present invention in a partially assembled form and having part of its locking tabs each aligned with the slot through which it will be inserted to complete assembly, also with a liquid-resistant and grease-resistant insert being aligned for insertion within one of the compartments in the platform dimensioned for holding food or a small toy.
Figure 7:
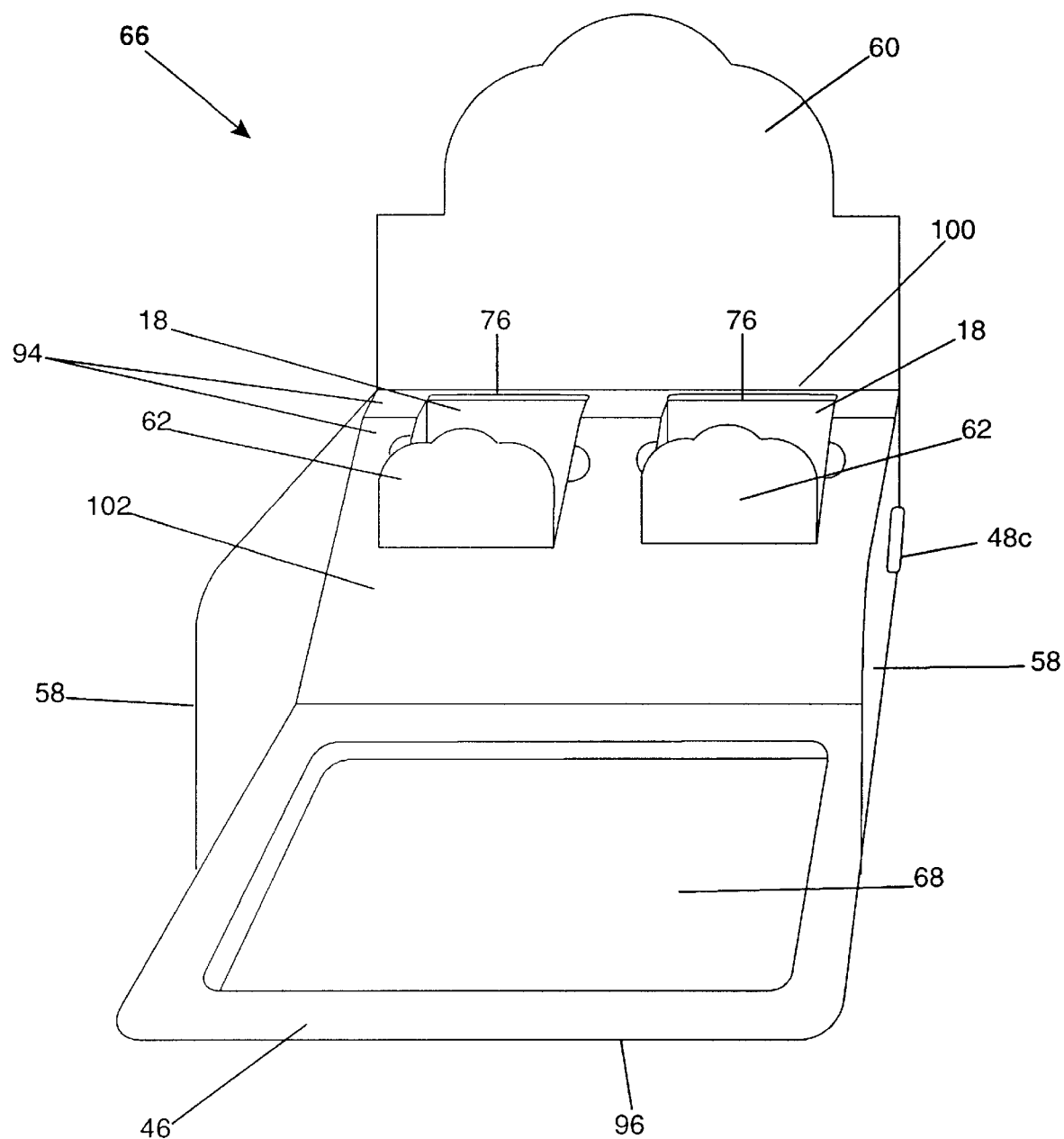
FIG. 7 is a front perspective view of the fifth embodiment of the present invention in a fully assembled form.

FIGS. 5, 6, and 7 show a fifth embodiment 66 of the present invention, with FIG. 5 showing fifth embodiment 66 in a flat configuration prior to assembly, FIG. 6 showing fifth embodiment 66 in a partially folded configuration, and FIG. 7 showing fifth embodiment 66 in a fully assembled form. In FIG. 5 fifth embodiment 66 is shown to be an essentially planar sheet 70 and have a variety of die cut lines 50, fold lines 52, slots 54*a–c*, and locking tabs 48*c–c* for use in placing fifth embodiment 66 in its assembled form and creating an indented base plate 68 with two raised small capacity compartments 18 which are dimensioned for holding a beverage container, food, or a small toy (not shown). Small capacity compartments 18 are each positioned within a platform 94 located between locking tabs 48*a* and the folding line 100 which defines the bottom front edge of back 60 when the fifth embodiment is in its fully assembled configuration. FIGS. 5, 6, and 7 also show platform 94 having a downward, diagonally extending front surface 102.

Indented base plate 68 is formed within the forward portion of a base member 46, located between slots 54*a* and forward free edge 96. FIGS. 5, 6, and 7 also show base member 46 having a rear portion located between slots 54*a* and rear edge 98. FIG. 5 also shows the sides 58 of the assembled invention positioned adjacent to base member, with stabilizing 46 extensions 86 centrally positioned within sheet 70. The back 60 of the assembled invention is also centrally located within sheet 70 and the front walls 62 of the assembled small capacity compartments 18 are positioned near to the end of sheet 70 remote from indented base plate 68. In FIGS. 5, 6, and 7, both back 60 and front walls 62 have a convexly scalloped upper perimeter. Such scalloped configuration is not critical to fifth embodiment 66 and it is contemplated for the upper perimeters of back 60 and front walls 62 to have a variety of other configurations as long as the upper perimeter of front walls 62 are not so tall as to interfere with a user (not shown) having access to food (not shown) placed within small capacity compartments 18.

FIG. 6 shows fifth embodiment 66 having some fold lines 52 partially bent forward so that locking tabs 48*a* are each aligned with one slot 54*a* to raise small capacity compartments significantly above the horizontal plane of indented base plate 68. In bending such fold lines forward, back 60 is created in a vertical plane substantially perpendicular to indented base plate 68 and the diagonally extending front surface 102 of platform 94 is placed in an inclined position relative to base member 46. FIG. 6 also shows both sides 58 partially folded which allows locking tabs 48*b* to begin to line up with slots 54*b*, as well as for locking tabs 48*c* to begin to line up with slots 54*c*, which are more clearly shown in FIG. 5. FIG. 6 also shows one insert, identified as number 72 in FIGS. 13 and 14, and made from a liquid-resistant and grease-resistant material 76, being aligned for insertion within one of the raised small capacity compartments 18 for holding food or a small toy. Although FIG. 6 only shows one piece of material 76 being inserted into the left small capacity compartment 18, it is equally contemplated for material 76 to be inserted into the right small capacity compartment 18, as well as for fifth embodiment 66 to have two pieces of liquid-resistant and grease-resistant material 76, one for each small capacity compartment 18, depending upon the type of food (not shown) intended use with fifth embodiment 66. FIG. 6 shows material 76 having a top opening and at least one stabilizing tab 92 depending from opposite sides of material 76. An elongated stabilizing tab 74 projects rearwardly from the entire back wall of material 76. Stabilizing tabs 92 and elongated stabilizing tab 74 help to better secure material 76 within small capacity compartment 18 during use. In FIG. 6 the front walls 62 of small capacity compartments are also folded into a configuration where they extend upwardly from indented base plate 68 and become nearly parallel to upright back 60.

FIG. 7 shows fifth embodiment 66 fully assembled and ready for use. Each small capacity compartment 18 has one piece of material 76 centrally positioned therein. Also sides 58 are positioned approximately perpendicular to base member 46, back 60, and front walls 62 of small capacity compartments 18. FIG. 7 also shows locking tab 48*c* extending through the right side 58 and the bottom perimeter of platform extending over less than half of base member 46.

Figure 8:
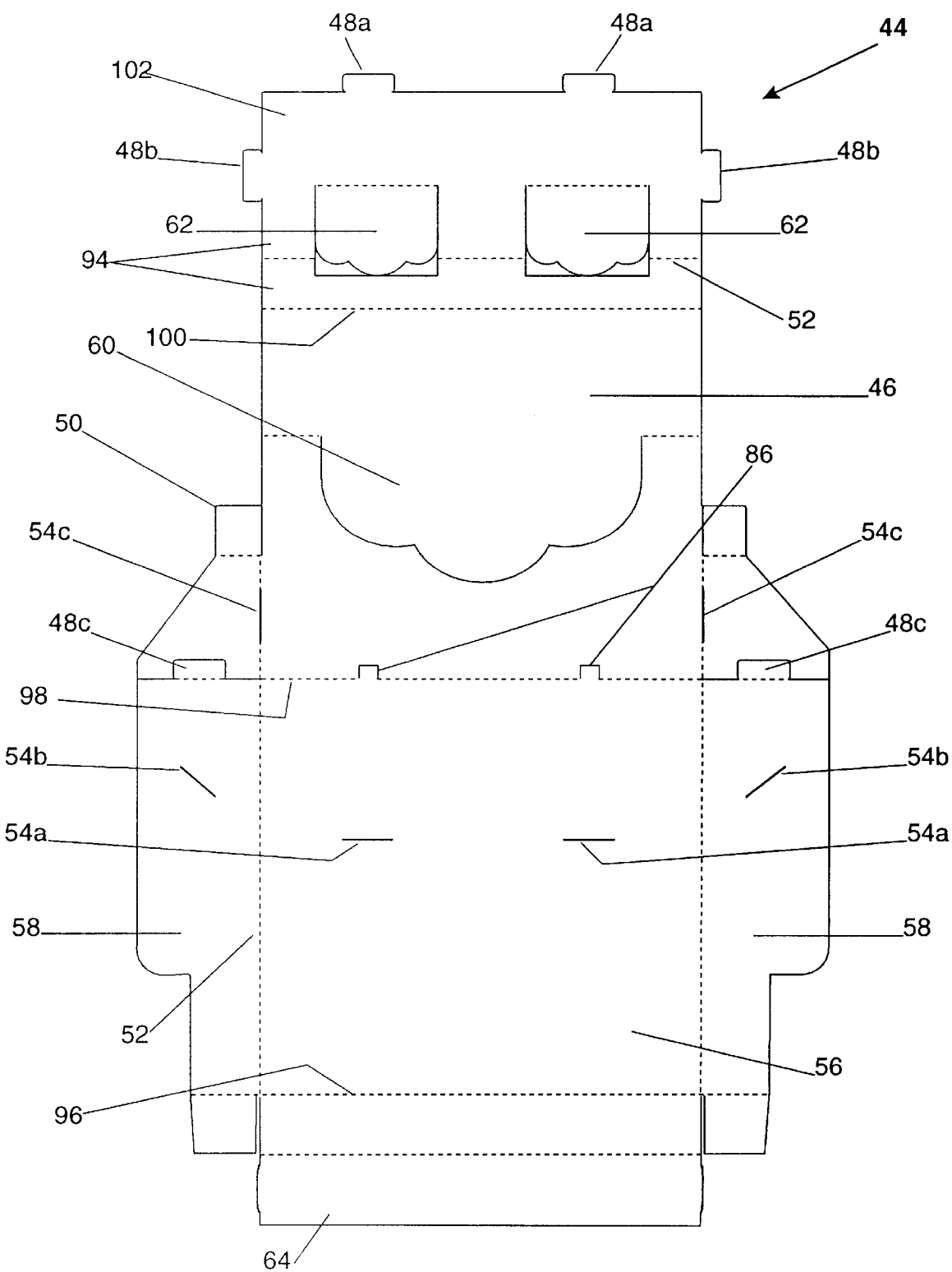
FIG. 8 is a top view of a sixth embodiment of the present invention in a flat unassembled form and having a variety of die cut lines, fold lines, slots, and locking tabs for use in forming an assembled device which would have a base plate configured as a tray and a platform with two compartments extending downwardly through it upper surface which are dimensioned for holding a beverage, food, or a small toy.
Figure 9:
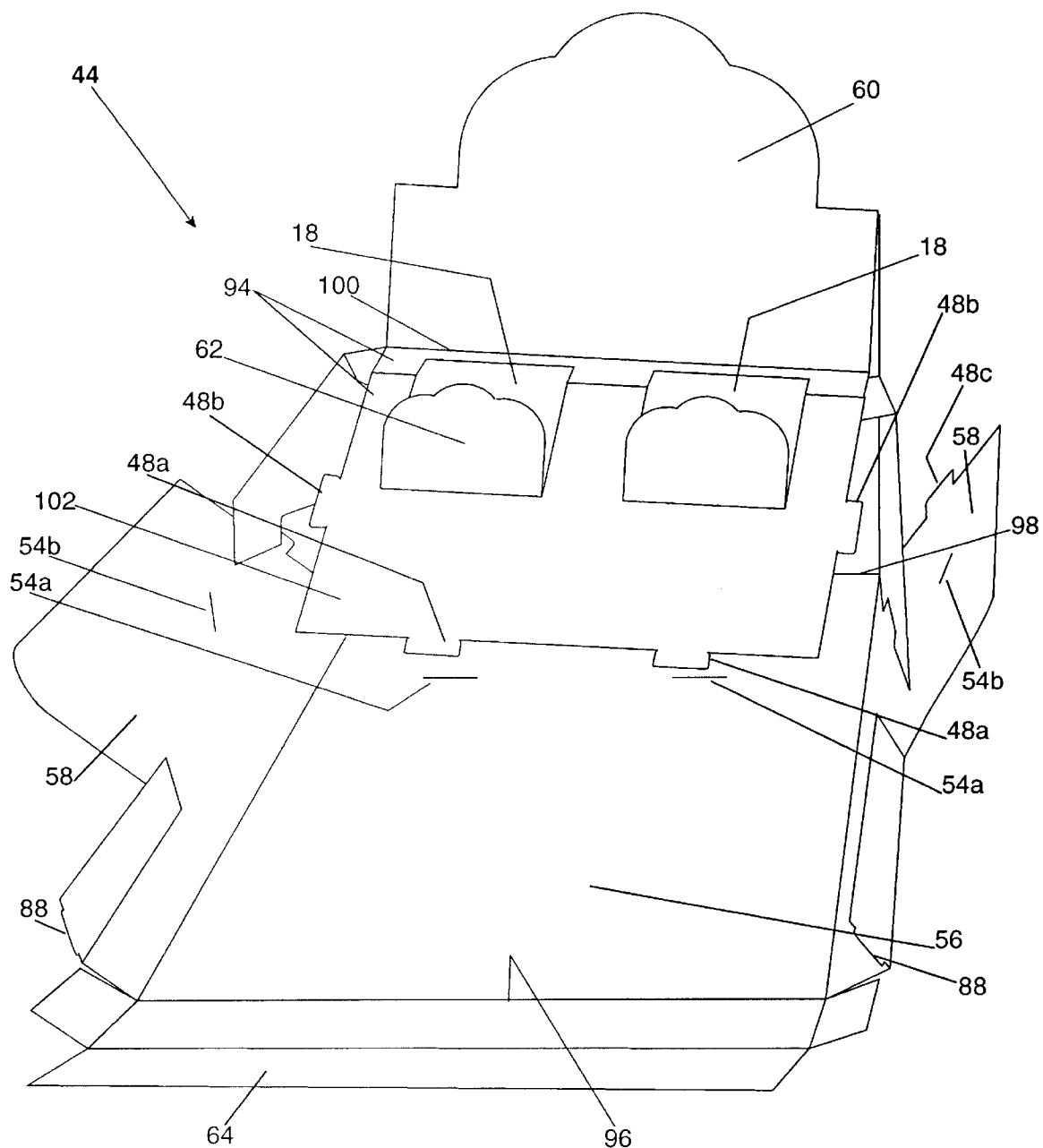
FIG. 9 is a front perspective view of the sixth embodiment of the present invention in a partially assembled form and having part of its locking tabs each aligned with the slot through which it will be inserted to complete assembly.
Figure 10:
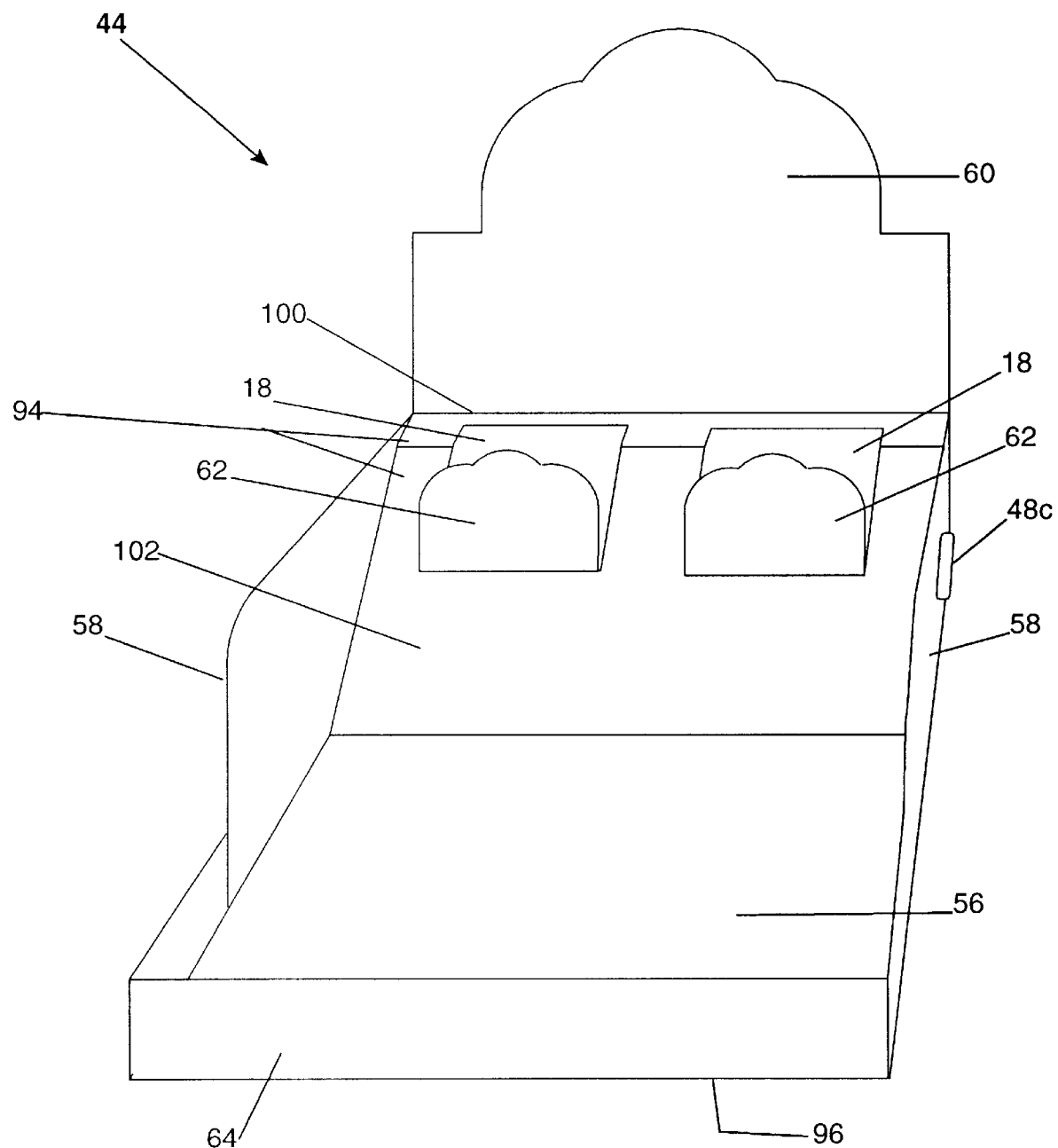
FIG. 10 is a front perspective view of the sixth embodiment of the present invention in a fully assembled form.

FIGS. 8, 9 and 10 show a sixth embodiment 44 of the present invention being a foldable disposable embodiment, with FIG. 8 showing sixth embodiment 44 in a flat configuration prior to assembly, FIG. 9 showing sixth embodiment 44 in a partially folded configuration, and FIG. 10 showing sixth embodiment 44 in a fully assembled form. In FIG. 8 sixth embodiment 44 is shown to be an essentially planar sheet 70 and have a variety of die cut lines 50, fold lines 52, slots 54*a–c,* and locking tabs 48*c–c* for use in placing sixth embodiment 44 into its assembled form and creating a tray-like base plate 56 and two raised compartments with front walls 62 which are each dimensioned for holding a beverage, food, or a small toy. Small capacity compartments 18 are each positioned within a platform 94 located between locking tabs 48*a* and the folding line 100 which defines the bottom front edge of back 60 when the sixth embodiment is in its fully assembled configuration. FIGS. 8, 9, and 10 also show platform 94 having a downward, diagonally extending front surface 102. FIGS. 8, 9, and 10 also show tray-like base plate 56 having a forward free edge 96 and a rear edge 98. FIG. 8 shows the front wall 64 and sides 58 adjacent to tray-like base plate 56, as well as centrally located stabilizing 86 which function as stabilizing feet for the fully assembled sixth embodiment. Although in FIGS. 8–10 both back 60 and compartment front walls 62 each have a similar concavely scalloped appearance, such scalloped appearance is not critical and it is contemplated for back 60 and front walls 62, although not so shown in FIGS. 8–10 as well as all other surfaces of sixth embodiment 44 which remain exposed after assembly, to form a canvas for surface decorations relating to an infinite number of topics to include but not be limited to images tied into motion picture and television show promotion, business logos, characters used in various advertising campaigns, and holiday themes. Such decoration could also be contoured to provide 3-D relief.

FIG. 9 shows sixth embodiment 44 in a partially assembled form with locking tabs 48*a* each aligned with one slot 54*a* through which it will be inserted to complete assembly and place the downward diagonally extending front surface 102 of platform 94 in an inclined position relative to base member 46. FIG. 9 also shows back 60 and front walls 62 of small capacity compartments 18 each oriented in an upright position approximately perpendicular to tray-like base plate 56. FIG. 9 further shows sides 58 also being raised into upright positions so locking tabs 48*b* can be aligned with and inserted into slots 54*b*. Although not critical to sixth embodiment 44, nor to other disposable folded embodiments of the present invention, and not shown, it is contemplated for glue, adhesives, and or bonding agents to be used to secure locking tabs 48*a–c* in place, as well as any surfaces which should be securely attached one against the other. FIG. 9 also shows the tray's front wall 64 being ready for folding upwards and back upon itself, with shortened tabs 88 ready to engage the tray's front wall 64 after folding to help maintain the tray's front wall in its folded configuration for use. FIG. 10 shows sixth embodiment 44 having front 64, sides 58, front walls 62 of small capacity containers 18, and back 60 to all be in upright orientations which are substantially perpendicular to tray 56. FIG. 10 also shows locking tab 48*c* extending through the rightmost side 58 of sixth embodiment 44.

Figure 11:
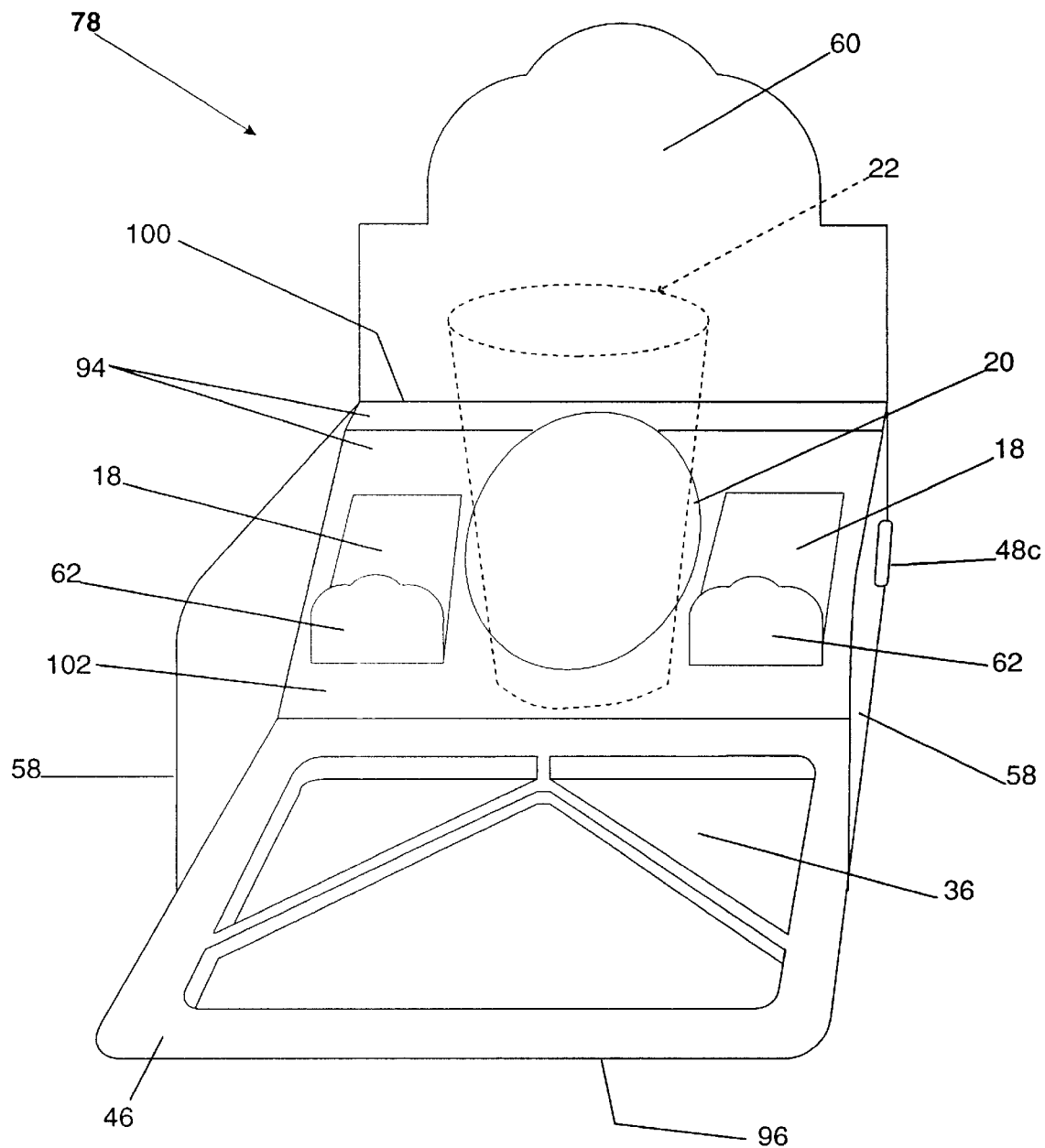
FIG. 11 is a front perspective view of a seventh embodiment of the present invention in a fully assembled form and having a folded construction with two smaller lateral rearward compartments dimensioned for holding food or a small toy and a larger compartment positioned between the two smaller compartments, with the larger compartment being dimensioned for holding a container for beverages or soup, the base plate also configured as a compartmentalized plate.

FIG. 11 shows a seventh embodiment 78 of the present invention in a fully assembled form and being a disposable embodiment having a folded construction. Locking tab 48*c* is visible extending through side 58. Back 60, both front walls 62, and both sides 58 are placed in approximately perpendicular positions relative to base member 46. FIG. 11 also shows seventh embodiment 78 having two rearwardly positioned smaller capacity compartments 18 dimensioned for holding food or a small toy (not shown) and one larger compartment 20 positioned centrally between the two smaller capacity compartments 18, with the larger compartment 20 being dimensioned for holding a container for beverages or soup. In FIG. 11, the positioning of a beverage or soup container 22 within larger compartment 20 is also shown. Small capacity compartments 18 and larger capacity compartment 20 are each positioned within a platform 94 located between food holding areas 36 and the folding line 100 which defines the bottom front edge of back 60 when the seventh embodiment is in its fully assembled configuration. FIG. 11 also shows platform 94 having a downward, diagonally extending front surface 102 and base member 46 having a forward free edge 96. Although FIG. 11 shows smaller capacity compartments 18 having a rectangular configuration and larger compartment 20 having a round configuration, the seventh embodiment is not limited to such geometric shapes. Also, although base member 46 is shown in FIG. 11 to have three separate areas 36 for placement of food (not shown), the number, size, and configuration of such areas 36 is not critical and can vary. Also, instead of base member 46 being limited to a rectangular configuration, as shown in FIG. 11, it is also contemplated for base member 46 to have other configurations, including those with a rounded front perimeter or ones with several angled segments which would result in base member 46 becoming a hexagon, pentagon, octagon, or other such geometric shape.

Figure 12:
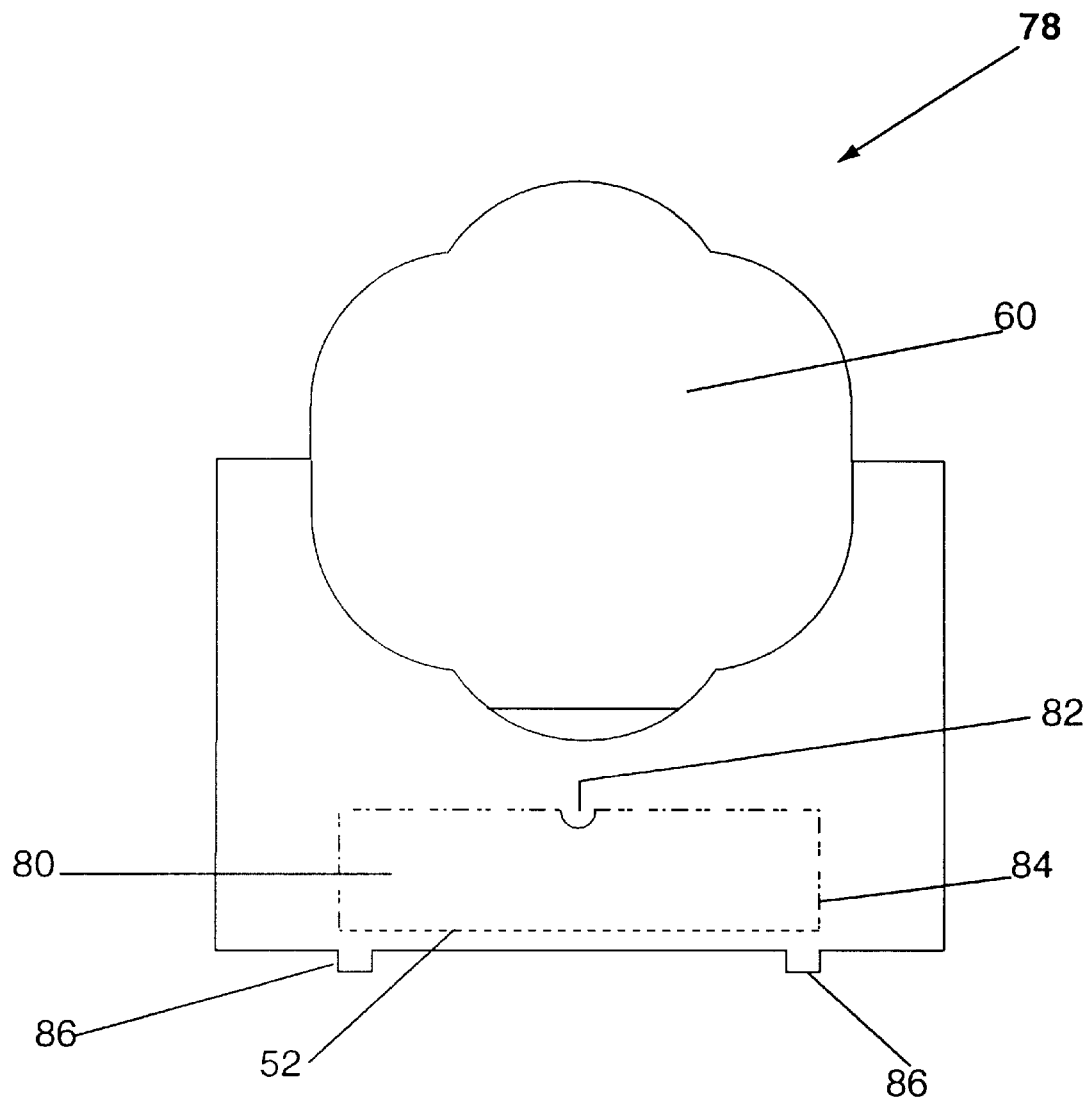
FIG. 12 is a back view of a folded embodiment of the present invention showing a hidden compartment with score lines and stabilizing tabs.

FIG. 12 shows seventh embodiment 78 from the rear to reveal a hidden compartment accessed by a rectangular door 80 formed by score lines 84 and bottom fold line 52. Opposed to fold line 52, FIG. 12 shows a finger-tip sized cutout for use in opening door 80. Although a rectangular door 80 would be preferred, it is contemplated for door 80 to also have other configurations. FIG. 12 also shows door 80 located below back 60 and two stabilizing tabs 86 positioned below door 80 which acts as stabilizing feet. The number, size and spaced-apart positioning of stabilizing extensions 86 is not critical as long as stabilizing extensions 86 evenly support the lower edge of the seventh embodiment. Although not shown, it would also be within the scope of the present invention for modular and molded embodiments to have hidden compartments, possibly formed in pillars 6 or 42 shown in FIG. 4, or in platforms 16 and 26 shown in FIGS. 2 and 3 respectively.

Figure 13:
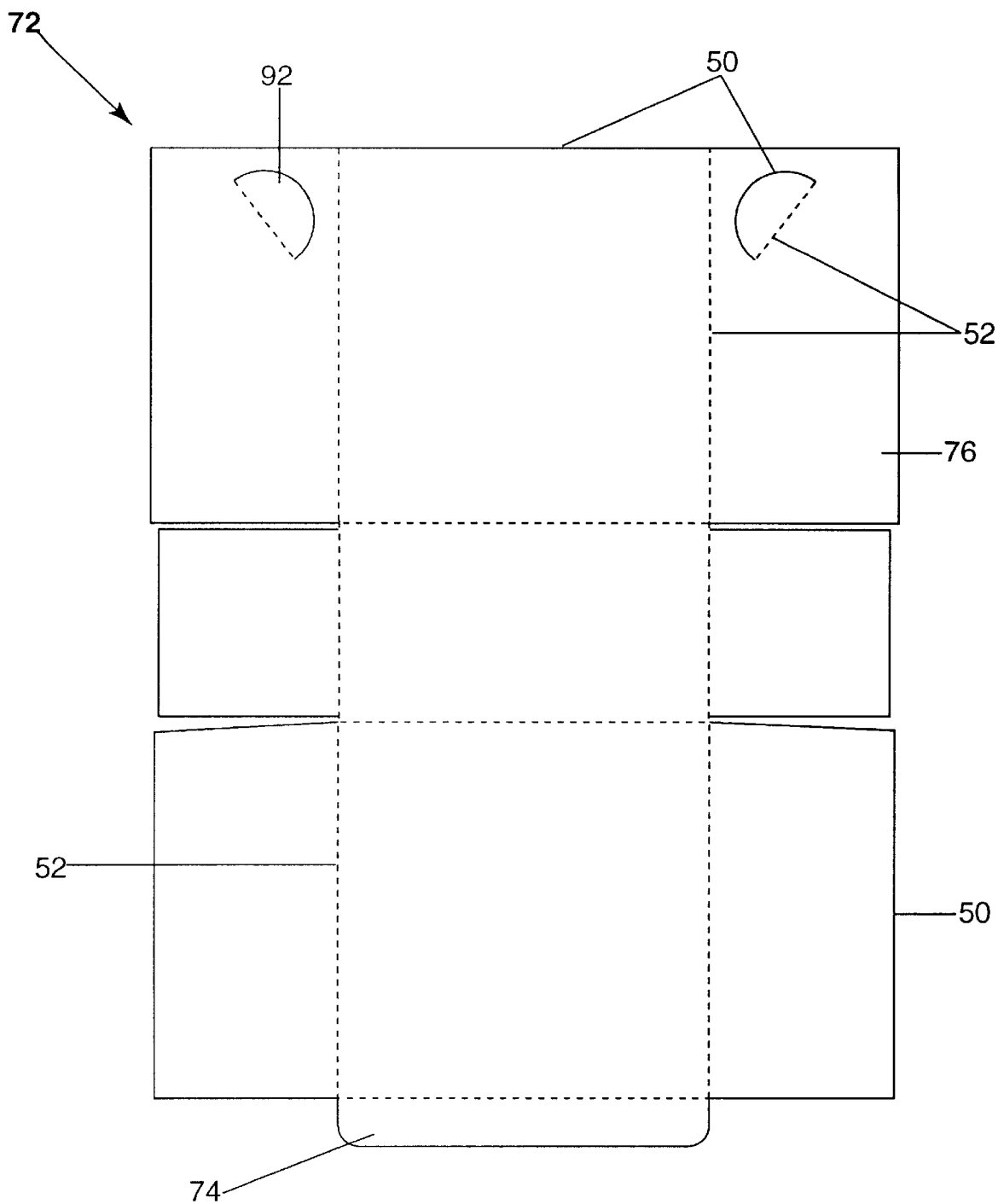
FIG. 13 is a top view of an unfolded liquid-resistant and grease-resistant insert for one of the folded embodiments of the present invention with die cut lines, fold lines, and stabilizing tabs.
Figure 14:
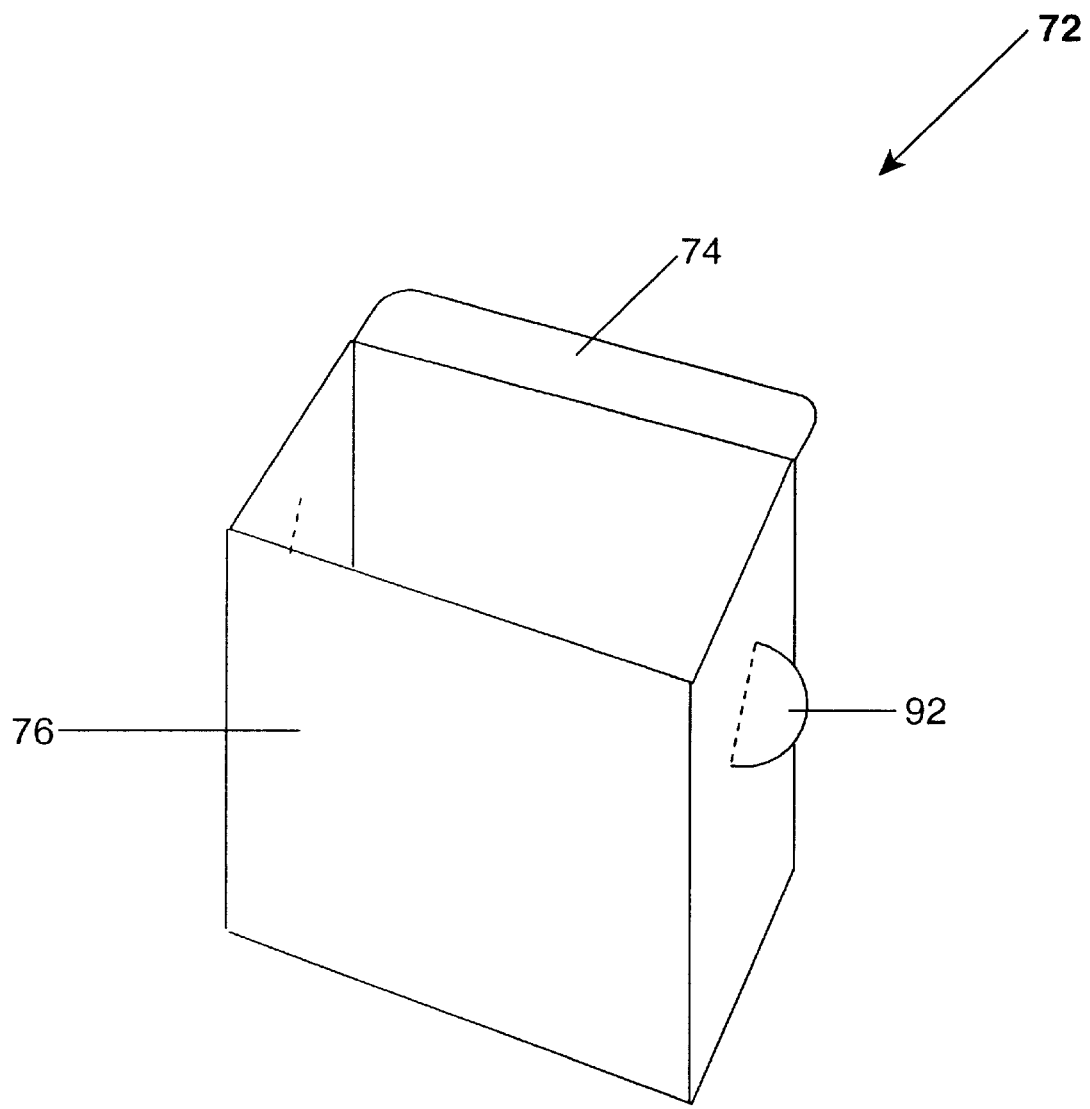
FIG. 14 is a perspective view of a fully assembled liquid-resistant and grease-resistant insert for one of the folded embodiments of the present invention with a large stabilizing tab rearwardly extending from the upper surface of the insert.

FIGS. 13 and 14 show liquid-resistant and grease-resistant insert 72 in greater detail. FIG. 13 shows one unfolded insert 72 in a flat configuration prior to folding and placement within one smaller capacity compartment 18 in a folded embodiment of the present invention. FIG. 13 shows insert 72 having die cut lines 50, fold lines 52, and two stabilizing tabs 92. The number of stabilizing tabs 92 is not critical, but the size and configuration of stabilizing tabs 92 must be such that insert 72 can be easily positioned within one smaller capacity compartment 18 yet held firmly in place during use. FIG. 13 also shows an elongated tab 74 on the end of liquid-resistant and grease-resistant material 76 remote from stabilizing tabs 92. FIG. 14 shows insert 72 in its fully assembled form made from liquid-resistant and grease-resistant material 76 with one stabilizing tab 92 partially cut away from the side of material 76 depending outwardly from material 76 to help secure material 76 within one small capacity compartment 18. FIG. 14 also shows one large stabilizing tab 74 rearwardly extending from the upper surface of insert 72 also for stabilizing and securing material 76 within one small capacity compartment 18 during use. Although not shown, it is contemplated for inserts 72 to be made from molded plastic. Further it is contemplated that inserts 72 made from molded plastic would not require stabilizing tabs 92 and for ease of handling inserts 72 made of plastic could have elongated tab 74 extending fully around the upper perimeter of insert 72.

FIGS. 15, 16, and 17 show a preferred embodiment of a sleeve 88 used for covering the food holding surfaces of folded embodiments of the present invention, such as fifth embodiment 66, during food transport. It is contemplated that sleeve 88 be designed for easy and rapid assembly, as well as for easy and rapid connection to fifth embodiment 66. FIG. 15 shows sleeve 88 in an unfolded condition and having cut lines 50, fold lines 52, a glue flap 90, and two locking tabs 48*d* and 48*e* which when sleeve 88 is folded will be in positions opposed from one another. When sleeve 88 is folded and glue flap 90 is connected to end of sleeve 88 remote thereto, sleeve 88 will be in the configuration of an open-ended rectangular box. The substance used to fasten glue flap 90 is not shown and is not critical. However, the type of glue strip or adhesive material used should be easily and quickly applied with sleeve 88 being immediately ready for use after glue flap 90 is connected. FIG. 16 shows sleeve 88 partially assembled and glue flap 90 being secured so that sleeve 88 is configured as an open-ended box. FIG. 16 also shows locking tabs 48*d* and 48*e* in opposed positions, but not yet connected to one another so as to close the near end of sleeve 88. FIG. 16 also shows sleeve 88 positioned relative to fifth embodiment 66 so that the remote end of sleeve 88 is poised for rearward movement toward back 60 to cover the food-supporting surfaces of fifth embodiment 66 for enhanced ease of handling of fifth embodiment 66 during transport, particularly for extended transport. FIG. 17 shows locking tabs 48*d* and 48*e* connected to one another so that sleeve 88 is now formed into a box-like configuration with only one open end. FIG. 17 also shows sleeve 88 in its usable position with the front edge of fifth embodiment 66 positioned adjacent to locking tabs 48*d* and 48*e* and the open end of sleeve inserted over fifth embodiment 66 so that the remote edge of sleeve 88 is positioned against back 60. When sleeve 88 is in its usable position, sleeve 88 forms a cover for protecting food (not shown) placed upon the upper surface of fifth embodiment 66. Since sleeve 88 has a rectangular configuration, the inside surface of sleeve 88 would remain at a spaced-apart distance from the food supporting surfaces of fifth embodiment 66 so that food thereon would remain undisturbed. Although FIG. 17 shows sleeve 88 positioned around fifth embodiment 66 with locking tabs 48*d* and 48*e* between the front and bottom surfaces of sleeve 88, it is equally contemplated for sleeve 88 to be used in an upside down orientation wherein locking tabs 48*d* and 48*e* would be positioned the front and top surfaces of sleeve 88. Also, although not shown, it is contemplated for locking tabs 48*d* and 48*e* to be used jointly as a handgrip for removing sleeve 88 from fifth embodiment 66 by the forward sliding of sleeve 88 away from fifth embodiment 66. In the preferred embodiment it is contemplated that deployment of sleeve 88 over the food supporting surfaces of fifth embodiment 66 would be most easily accomplished by a user holding fifth embodiment 66 in one hand and gripping at least two different surfaces of sleeve 88, such as the front surface and either the top or bottom surface of sleeve 88, or the top, bottom, and one side surface of sleeve 88. Then with fingers in such a position, the user would push sleeve 88 over the forward portions of fifth embodiment 66 until the edges around the open end of sleeve 88 came to rest against back 60. It is also contemplated in the preferred embodiment that removal of sleeve 88 from fifth embodiment 66 could be accomplished either by gripping the side, top and bottom surfaces of sleeve 88 directly or through use of locking tabs 48*d* and 48*e*. In addition to its food protecting function, it is also contemplated that sleeve 88 provides support to fifth embodiment 66 to strengthen it during transport, particularly during extended transport.

Use and of the embodiments of the present invention would provide a fun-to-use, versatile eating surface apparatus that would offer multiple levels upon which food could be served to an individual (not shown). They could also be used as a teaching tool for children in a variety of ways. In modular and molded embodiments upper plates 8 would be attached to and positioned above the essentially surface of base plate 4 to increase the total surface available for food placement without at the same time increasing the amount of table surface area (not shown) required by the individual to station his or her food until it is consumed. Upper plates 8 could be used to separate foods from one another when doing so would improve its presentation, as well as enjoyment by the individual. Base plate 4 of the any of the modular or molded embodiments of the present invention could be configured as a plate or a tray. The reusable modular embodiments with separable components are also both easy to clean and store.

Although not shown, the reusable modular and molded embodiments could be made from materials such as plastic, glass, ceramics, metal, and wood, while it is contemplated that disposable foldable embodiments could be made from materials which include paper, plastic, and styrofoam. All embodiments can be made to have a variety of sizes, colors, shapes and levels of transparency from transparent to translucent, and to opaque. All embodiments can have the upper eating surfaces at a uniform height or at different heights. When upper plates 8 are positioned at different heights, the present invention can be used to teach children (not shown) to eat new foods by making them work their way up to a dessert located on the upper plate 8 having the highest position relative to base plate 4. The multiple levels also make the present invention toy-like and therefore useful as a learning tool that captures the interest of children particularly when surface decoration would include the face of a person or character familiar to the child. Different levels of the present invention could be numbered with children earning points as numbers foods is consumed and numbers revealed. The numbering could also assist a child's assembly skills and understanding of logical progression. Batteries (not shown) could be placed within one of the pillars to further enhance the teaching value of the present invention by turning it into a talking character that presented safety related or other important messages to children. Although not shown, surface areas of all the embodiments can be decorated with markings relating to many diverse topics, such as promotion of a movie, business logo, advertising campaign, or holiday theme. Such decoration could be contoured to provide 3-D relief. Also, it is contemplated for at least some of the modular and molded embodiments to have designated areas with quick-releasing fasteners 38 configured for the attachment of utensils and/or elongated toy-sized objects 40. Further, embodiments of the present invention could comprise an enlarged compartment 20 for a beverage container 22, as well as a hidden compartment for retention of a condiment, prize, or other surprise.

What is claimed is:

1. Compartmented apparatus having multiple level eating surfaces for serving food to an individual with enhanced vertical food holding capacity while maintaining a compact footprint, said apparatus comprising:

a substantially planar base member having a forward portion with a horizontally oriented eating surface adapted for receipt of food items, said base member also having a rearward edge;

a large back member vertically extending from said rearward edge;

a food placement platform having a substantially horizontal upper surface contiguous with a downward diagonally extending front surface, said platform also defined rearwardly by said back member and having a perimeter dimension smaller than said base member, said upper surface being positioned higher than and rearward from said eating surface;

a plurality of compartments within said platform adapted for holding food, each of said compartments having an upper opening;

a front wall positioned in front of each of said compartments and upwardly depending from said diagonally extending front surface of said platform, said front walls each configured and dimensioned to separate food items placed on said base member from food items placed into the one of said compartments closet thereto, each of said front walls having a top edge, and a bottom edge; and attachment means adapted for connecting said platform to said base member.

2. The apparatus of claim 1 wherein said base member has a perimeter dimension and wherein said platform has a lower perimeter dimension and further wherein said lower perimeter dimension of said platform is less than one-half of said perimeter dimension of said base member.

3. The apparatus of claim 1 wherein said base member is selected from a group consisting of dining plates having one centrally located food containing indentation; dining plates having a compartmented central area; trays having one centrally located food containing indentation; and compartmented trays.

4. The apparatus of claim 1 wherein said apparatus is made from at least one foldable sheet having a plurality of die cut lines and a plurality of fold lines.

5. The apparatus of claim 1 further comprising a plurality of locking tabs and a plurality of slots configured for receipt of said locking tabs.

6. The apparatus of claim 1 further comprising a plurality of quick-release fasteners attached to said base member each configured and dimensioned for holding utensils and small elongated toys.

7. The apparatus of claim 1 further comprising hidden compartment means adapted for holding small quantities of condiments, prizes, and small toys and providing easy access thereto.

8. The apparatus of claim 1 wherein said apparatus is made from at least one foldable sheet having a plurality of die cut lines, a plurality of fold lines, at least one insert made of liquid-resistant and grease-resistant material, each said insert having a food receiving upper hole, each said upper hole having length and width dimensions slightly smaller than said upper opening in the one of said compartments into which it is intended for said insert to be placed during use so that each said insert can be securely placed within said intended compartment during use, and further comprising an easily detachable five-sided sleeve adapted for rapidly covering said eating surface of said base member and said platform at a uniform spaced-apart distance from said eating surface, said sleeve having a length dimension, a width dimension, and a height dimension, said base member having a front edge and a width dimension, and said platform having width and height dimensions, said height dimension of said sleeve being slightly taller than the height dimension of said platform, said with dimension being slightly larger than said width dimensions of said base member and said platform, and when said sleeve is in a usable position covering said base member and said platform, said length dimension of said sleeve extending from said front edge of said base member to said back member.

9. The apparatus of claim 1 wherein said apparatus is made from at least one foldable sheet having a plurality of die cut lines and a plurality of fold lines, and further comprising at least one insert made of liquid-resistant and grease-resistant material, each said insert having a food receiving upper opening and length and width dimensions slightly smaller than the one of said compartments into which it is intended for placement during use so that each said insert is securely placed within one of said compartments during use.

10. The apparatus of claim 9 wherein each said insert further comprises a plurality of stabilizing tabs with said stabilizing tabs configured for secure placement against said upper surface of said platform.

11. The apparatus of claim 9 wherein said apparatus is made from at least one foldable sheet and is further made from materials selected from a group consisting of paper, plastic, and polystyrene.

12. The apparatus of claim 1 wherein said apparatus is made from at least one foldable sheet having a plurality of die cut lines, a plurality of fold lines, and wherein said apparatus further comprises an easily detachable five-sided sleeve adapted for rapidly covering said eating surface of said base member and said platform at a spaced-apart distance from said eating surface and said platform, said sleeve having a length dimension, a width dimension, and a height dimension, said base member having a front edge and a width dimension, and said platform having width and height dimensions, said height dimension of said sleeve being slightly taller than the height dimension of said platform, said width dimension being slightly larger than said width dimensions of said base member and said platform, and when said sleeve is in a usable position covering said base member and said upper surface of said platform, said length dimension of said sleeve extending from said front edge of said base member to said back member.

13. A method for multiple level food serving and consumption for individuals without unpleasant mixing of food while maintaining a compact food serving footprint, said method comprising the steps of:

providing a food holding device having a substantially planar base member with an eating surface adapted for receipt of food, a food placement platform having an upper surface, a downward diagonally extending front surface contiguous with said upper surface, and at least one compartment, said platform having a lower perimeter dimension smaller than said base member, also providing a large back member contiguous with said base member and said platform;

further providing a plurality of food items;

orienting said base member so that said eating surface is in an upward position;

orienting said back member in a substantially vertical position rearward from said eating surface;

connecting said platform to said base member rearward from said eating surface so that said upper surface and said diagonally extending front surface of said platform are higher than said eating surface of said base member;

forming a front wall from said platform in front of each of said compartments so that said front walls are each upwardly extending in a substantially vertical orientation from said upper surface of said platform and so that said back member extends vertically higher than said platform and said front walls; and placing said food items onto said eating surface and into said compartments within said platform so that the number of said food items served to an individual can be amplified and said food items can be distributed over said base member and said platform to provide the individual with a better organized presentation of said food items.

14. The method of claim 13 wherein the step of providing said platform comprises the steps of providing a platform selected from a group consisting of platforms having at least one upper food opening therethrough, and platform having at least one upper beverage container opening therethrough.

15. The method of claim 13 further comprising the steps of providing at least one additional foldable sheet selected from a group consisting of liquid-resistant sheets and grease-resistant sheets, forming an insert from each said additional foldable sheet, and placing each said insert into one of said compartments in said platform.

16. The method of claim 13 further comprising the steps of providing a food-protecting sleeve and slidably connecting said sleeve over said eating surface of said base member and said platform at a spaced-apart distance from said eating surface.

17. The method of claim 13 wherein the step of providing said base member further comprises a step of providing a base member selected from a group consisting of dining plates having one centrally located food containing indentation; dining plates having a compartmented central area; trays having one centrally located food containing indentation; and compartmented trays.

18. The method of claim 13 further comprising the steps of providing a plurality of quick-release fasteners adapted for holding utensils and small elongated toys and attaching said quick-release fasteners to said base member.

19. The method of claim 13 further comprising the steps of providing a door in said platform configured so as to create a hidden compartment within said platform adapted for holding small quantities of condiments, prizes, and diminutive toys.

20. The method of claim 13 wherein said step of providing said device further comprises the providing of foldable sheets selected from a group consisting of paper sheets, plastic sheets, and polystyrene sheets.

* * * * *